(12) United States Patent
Inadome (10) Patent No.: US 8,390,902 B2
(45) Date of Patent: Mar. 5, 2013

(54) IMAGE SCANNING APPARATUS AND IMAGE SCANNING METHOD

(75) Inventor: Takanori Inadome, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 431 days.

(21) Appl. No.: 12/711,620

(22) Filed: Feb. 24, 2010

(65) Prior Publication Data

US 2010/0231989 A1 Sep. 16, 2010

(30) Foreign Application Priority Data

Mar. 14, 2009 (JP) ................................ 2009-062142

(51) Int. Cl.
H04N 1/04 (2006.01)

(52) U.S. Cl. ........ 358/474; 358/475; 358/488; 382/254; 382/264; 348/208.99

(58) Field of Classification Search ................. 358/474, 358/475, 509, 497, 496, 501, 448, 488; 382/286, 382/302, 199, 254, 255, 264; 348/208.99
See application file for complete search history.

(56) References Cited

U.S. PATENT DOCUMENTS

| 4,775,104 A * | 10/1988 | Harkins ........................ 239/314 |
| 5,023,919 A * | 6/1991 | Wataya ......................... 382/263 |
| 5,200,849 A * | 4/1993 | Inagaki et al. .............. 359/196.1 |
| 5,652,952 A * | 7/1997 | Katsuhara ...................... 399/72 |
| 5,678,132 A * | 10/1997 | Shiba et al. ...................... 399/59 |
| 6,545,703 B1 * | 4/2003 | Takahashi et al. .............. 348/69 |
| 6,548,800 B2 * | 4/2003 | Chen et al. ................. 250/208.1 |
| 6,683,643 B1 * | 1/2004 | Takayama et al. ............ 348/247 |
| 6,795,579 B2 * | 9/2004 | Tang et al. ..................... 382/185 |
| 7,257,273 B2 * | 8/2007 | Li et al. .......................... 382/286 |
| 7,498,553 B2 * | 3/2009 | Shimokawa .................. 250/205 |
| 7,519,231 B2 * | 4/2009 | Li et al. .......................... 382/264 |
| 7,561,186 B2 * | 7/2009 | Poon ........................ 348/208.99 |
| 8,086,163 B2 * | 12/2011 | Miyoshi ......................... 399/367 |
| 8,218,888 B2 * | 7/2012 | Nagase et al. ................. 382/255 |
| 2008/0089706 A1 * | 4/2008 | Nakazato et al. ............... 399/44 |
| 2008/0192984 A1 | 8/2008 | Higuchi et al. |
| 2008/0218724 A1 | 9/2008 | Nishina et al. |
| 2009/0067861 A1 * | 3/2009 | Miyoshi .......................... 399/51 |
| 2009/0116084 A1 * | 5/2009 | Shimokawa .................. 358/509 |
| 2010/0158402 A1 * | 6/2010 | Nagase et al. ................. 382/255 |

FOREIGN PATENT DOCUMENTS

JP 2007-212949 8/2007

OTHER PUBLICATIONS

Office Action issued Sep. 22, 2011, in Chinese Patent Application No. 201010135557.8.

* cited by examiner

Primary Examiner — Negussie Worku
(74) Attorney, Agent, or Firm — Oblon, Spivak, McClelland, Maier & Neustadt, L.L.P.

(57) ABSTRACT

An image scanning apparatus, including a contact glass having an original to be scanned on; a light source including plural dotted light-emitting elements linearly arrayed in a main scanning direction and emitting scanning light to the original; a photoelectric converter photoelectrically converting reflected scanning light from the original to produce line-image data in the main scanning direction; a halation detector receiving the line-image data from the photoelectric converter and detecting whether the line-image data has halation; and a corrector receiving information whether the line-image data has halation and correcting pixel values of all pixels of the line-image data having halation into a predetermined pixel value.

14 Claims, 7 Drawing Sheets

IMAGE SCANNING APPARATUS AND IMAGE SCANNING METHOD

BACKGROUND OF THE INVENTION

1. Field of the Invention

The present invention relates to an image scanning apparatus and an image scanning method, and more particularly to an image scanning apparatus and an image scanning method scanning high-quality images, properly inhibiting halation.

2. Discussion of the Background

In image scanning apparatuses of scanning apparatuses, copiers, complex machines, etc., linear light sources capable of emitting continuous linear reading light to an original to be scanned such as Xe lamps and cold-cathode tube lamps have conventionally been used.

However, these light sources largely vary in light quantity as time passes and have short lives, and are difficult to maintain and expensive.

When the scanning light is emitted to the original to scan while the original is floating from a transparent original table, halation occurs, i.e., the original image density increases (images scanned become white).

Recently, lower-cost, longer-life and easier-controlled LEDs (Light Emitting Diodes) have been used as light sources for scanning images.

When the LED emitting point-like light is used as a light source, a light source substrate on which the LEDs are arrayed in the scanning direction is typically used.

Figure 12:
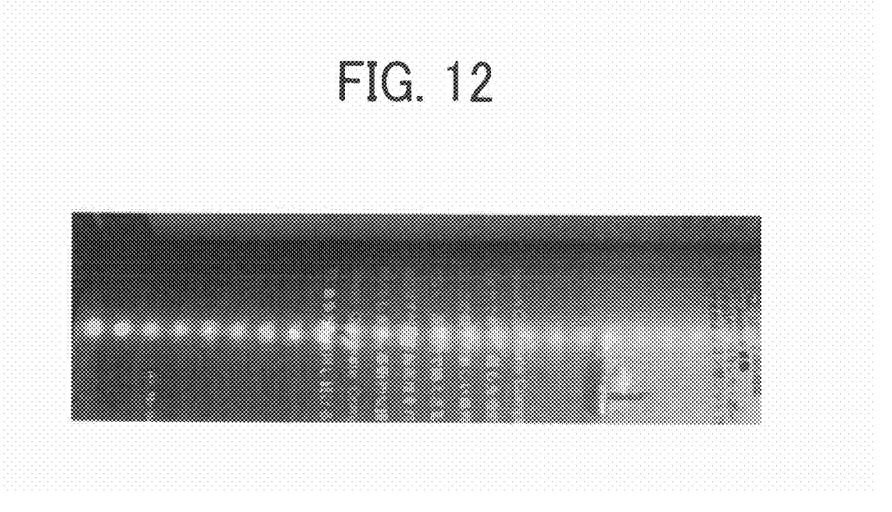
FIG. 12 is a photograph showing an example of halation image when an LED light source is used.

Different from the conventional linear light sources such as Xe lamps, the LED-arrayed light source has strong light intensity at positions corresponding to array pitches of the LEDs and abnormal images having dotted blanks in a specific line are produced as FIG. 12 shows. Such halation is likely to occur when the center of a book placed on a contact glass, which is floating from the glass is scanned. In addition, glossy originals tends to occur halation more. Namely, this is because regular-reflected light at a curved part enters a light axis collecting scanning light comes to have strong light intensity. Japanese published unexamined application No. 2007-212949 discloses a method of locating a light-emitting element emitting light through a transparent material to an original such that a part of the light causing abnormal images is totally reflected on the transparent material or a shade member inhibiting the light from reaching the original to prevent halation.

However, because a part the scanning light is totally reflected on the transparent material or shaded with a shade member to prevent halation, the light quantity of the scanning light lowers, resulting in deterioration of reading efficiency, or the extra shade member increases the cost.

Because of these reasons, a need exists for an image scanning apparatus and an image scanning method capable of forming high-quality scanned images at low cost, preventing halation images having dotted blanks when using a light source in which dotted light-emitting elements are linearly arrayed.

SUMMARY OF THE INVENTION

Accordingly, an object of the present invention is to provide an image scanning apparatus capable of forming high-quality scanned images at low cost, preventing halation images having dotted blanks when using a light source in which dotted light-emitting elements are linearly arrayed.

Another object of the present invention is to provide an image scanning method using the image scanning apparatus.

These objects and other objects of the present invention, either individually or collectively, have been satisfied by the discovery of an image scanning apparatus, comprising:

a contact glass configured to have an original to be scanned on;

a light source, comprising plural dotted light-emitting elements linearly arrayed in a main scanning direction, configured to emit scanning light to the original;

a photoelectric converter configured to photoelectrically convert the scanning light reflected from the original to produce line-image data in the main scanning direction;

a halation detector configured to receive the line-image data and detect whether the line-image data has halation; and a corrector configured to receive information from the halation detector whether the line-image data has halation and correct pixel values of all pixels of the line-image data having halation into a predetermined pixel value.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The present invention provides an image scanning apparatus capable of forming high-quality scanned images at low cost, preventing halation images having dotted blanks when using a light source in which dotted light-emitting elements are linearly arrayed. More particularly, the present invention relates to an image scanning apparatus, comprising:

a contact glass configured to have an original to be scanned on;

a light source, comprising plural dotted light-emitting elements linearly arrayed in a main scanning direction, configured to emit scanning light to the original;

a photoelectric converter configured to photoelectrically convert the scanning light reflected from the original to produce line-image data in the main scanning direction;

a halation detector configured to receive the line-image data and detect whether the line-image data has halation; and a corrector configured to receive information from the halation detector whether the line-image data has halation and correct pixel values of all pixels of the line-image data having halation into a predetermined pixel value.

Hereinafter, a preferred embodiment of the present invention will be explained in detail, referring to the drawings. The following Example is a preferred embodiment of the present invention and has various technical limitations, but the present invention is not particularly limited with the following descriptions and all the descriptions are not essential for present invention.

Example 1

Figure 1:
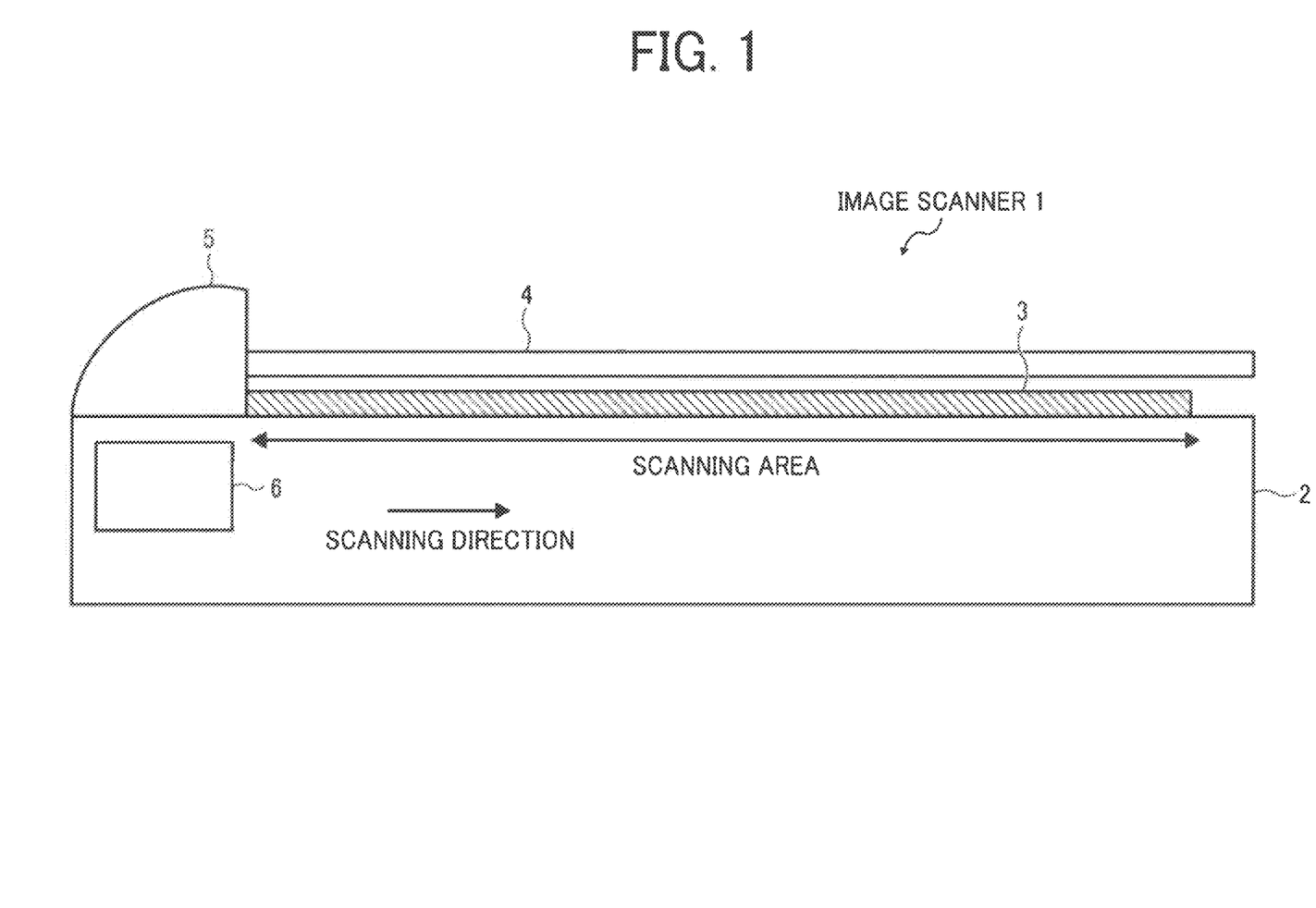
FIG. 1 is a schematic view illustrating an embodiment of the image scanning apparatus of the present invention.

FIG. 1 is a schematic view illustrating an embodiment of the image scanning apparatus of the present invention.

Figure 2:
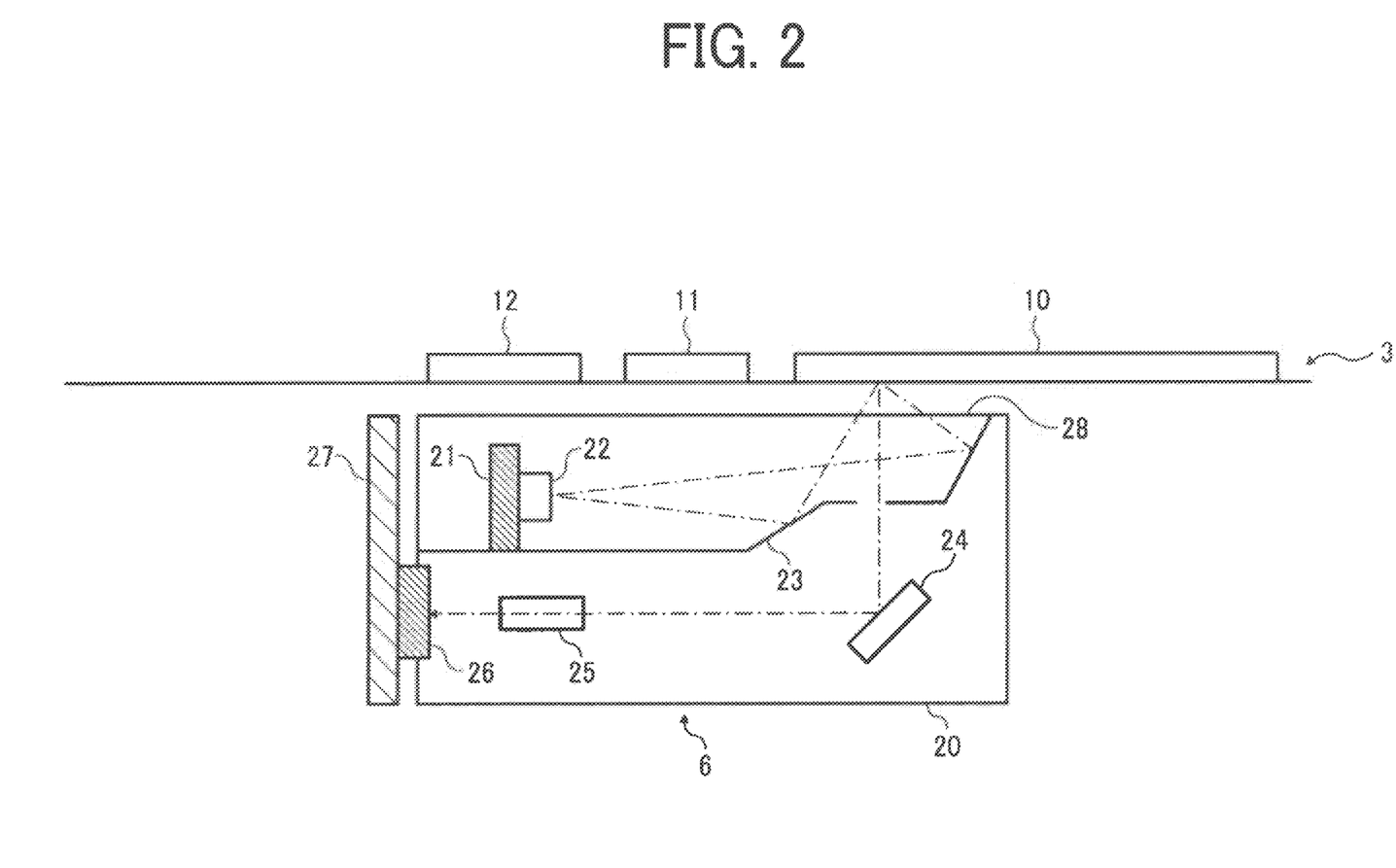
FIG. 2 is a schematic view illustrating a detailed configuration diagram of an embodiment of the image scanning unit of the present invention.

In FIG. 1, an image scanning apparatus 1 includes an original scanning table 3 on its chassis 2, and the original scanning table 3 includes a contact glass 10 which is a transparent original table (FIG. 2). An openable and closable original press plate 4 is located above the original scanning table 3 and presses an original G set on the original scanning table 3 so as to contact the original G to the contact glass 10.

An ADF (Auto Document Feeder) 5 is located above the left side of the chassis 2 in FIG. 1, and an image scanning unit 6 is movably located in a horizontal (sub-scanning) direction indicated by an arrow as a scanning direction in FIG. 1 below the original scanning table 3 inside the chassis 2.

The ADF 5 includes an original table plural originals G are placed on, an original detector detecting whether there is an original G on the original table, an original feeder, a discharged paper tray, etc. (not shown). The ADF 5 feeds the plural originals G on the original table to a scanning position of the original scanning table 3 one by one and discharges the originals G having been scanned onto the discharged paper tray.

The ADF 5 has an integral construction with the original press plate 4, and when the original press plate 4 is opened and closed, the ADF is opened and closed together.

In the original scanning table 3, as shown in FIG. 2, a white standard plate 11 for shading correction and a glass for ADF 12 which is a transparent original table are located nearer the ADF 5 than the contact glass 10.

The image scanning unit 6 includes, as shown in FIG. 2, a unit case 20, an LED substrate 21, an LED 22, a reflection plate 23, a mirror 24, a lens 25, a CCD (Charge Coupled Device) 26, a SBU (Sensor Board Unit) 27, etc., and a transparent glass 28 is located on the upper surface of the unit case 20 (surface nearer the original scanning table 3.

The LED 22 (dotted light-emitting element) is actually installed on the LED substrate 21, and plural LEDs 22 are linearly installed on the LED substrate 21. When applied with current, the LED 22 irradiates scanning light according to the current quantity to the original G. The scanning light irradiated from the LED 22 is reflected by the reflection plate 23 toward the original scanning table 3 through the transparent 28, and is irradiated to the original G on the contact glass 10 or the glass for ADF 12 through the contact glass 10 or the glass for ADF 12. The scanning light irradiated to the original G is reflected thereby and further reflected by the mirror 24 toward the lens 25, and is collected thereby to the CCD 26. Further, the scanning light irradiated from the LED 22 is irradiated to the white standard plate 11, and the scanning light reflected thereby is reflected by the mirror 24 toward the lens 25, and is collected thereby to the CCD 26. The CCD 26 photoelectrically converts the incident light and produces an analog image signal.

Figure 3:
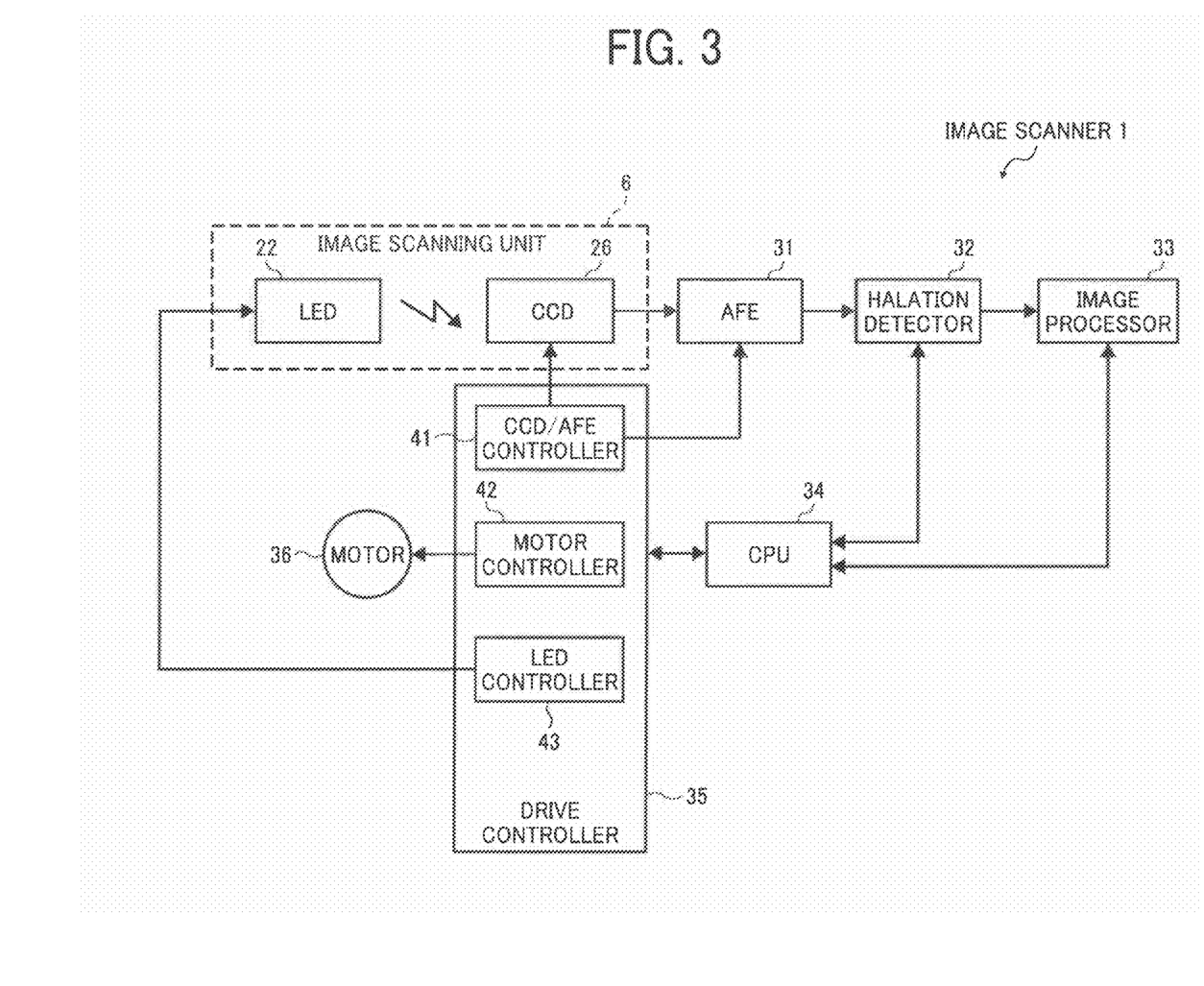
FIG. 3 is a main block configuration diagram of the image scanning apparatus.

The image scanning apparatus 1 includes, as shown in FIG. 3, a ROM (Read Only Memory) and a RAM (Random Access Memory) as well as the image scanning unit 6, an AFE (Analog Front End) 31, a halation detector 32, an image processor 33, a CPU (Central Processing Unit) 34, a drive controller 35, a motor 36, etc. The drive controller 35 includes a CCD/AFE controller 41, a motor controller 42 and an LED controller 43, etc.

The CPU 34 uses the RAM as a work memory based on a program stored in the ROM and controls every part of the image scanning apparatus 1 to execute a basic process thereof and the image scanning process of the present invention.

The image scanning apparatus 1 reads an image scanning program executing the image scanning method of the present invention recorded in recoding media readable by computers such as ROMs, EEPROMs (Electrically Erasable and Programmable Read Only Memories), EPROMs, flash memories, flexible discs, C-ROMs (Compact Disc Read Only Memories), CD-RWs (Compact Disc Rewritable), DVD (Digital Video Disk), SD (Secure Digital) cards and MO (Magnet-Optical Discs). The image scanning apparatus 1 further introduces the image scanning program into a ROM or a hard disc to detect whether halation occurs in scanned image data mentioned later and correct the scanned image data when halation occurs. The image scanning program is a computer-executable program described in legacy programming languages such as assembler, C, C++, C# and Java (trade mark) or object-oriented programming languages, and storable and distributable in the above-mentioned recording media.

The image scanning unit 6, as mentioned above, irradiates scanned light emitted from the LED 22 to the original G through the contact glass 10 or the glass 12 for ADF or to the white standard plate 11. The original G introduces the light reflected by the white standard plate 11 into the CCD 26, and is photoelectrically converted thereby into an analog image signal entering the AFE 31.

The AFE 31 converts the analog image data entered from the CCD 26 into digital image data, and adjusts dark offset level and bright output.

The halation detector (a halation detection means, a comparison means, a decision means and a light emitting element abnormality detection means) 32 is activated under the control of CPU 34, and performs a halation detection process of detecting if halation occurs from the digital image data produced from the AFE 31 and a trouble detection process of detecting a trouble of the LED 22 from a relation between a position of the plural LEDs 22 arrayed as a scanning light source in the main scanning direction and a position of a pixel locally having a high output level due to halation, and feeds image data to the image processor 33.

The image processor (a correction means) 33 is activated under the control of CPU 34 and performs various image processes such as halation correction, dark output correction, shading correction and γ correction for the digital image data digitally converted by the AFE 31. Then, the image processor 33 feeds the corrected digital image data to the subsequent process, e.g., stores them in a hard disc, feeds them to an image data transferer or a printer, and corrects all pixels of line-image data having halation to have a predetermined pixel value.

A CCD/AFE controller 41 feeds a drive signal to the CCD 26 and the AFE 31 under the control of CPU 34 to control operations of the CCD 26 and the AFE 31. The motor controller 42 controls the motor 36 to move the image scanning unit 6 in the main scanning direction and is a generic name of motors of the ADF 5 feeding the originals.

The LED 43 feeds an LED control signal to the LED 22 under the control of CPU 34 to light up the LED 22

Next, an operation of this Example will be explained. The image scanning apparatus 1 irradiates light to the original G from the plural linearly-arrayed LED 22 and photoelectrically converts the light reflected from the original to detect whether halation occurs in the scanned original image data per a line unit, and correct the line-image data when halation occurs.

Namely, in a mode of ADF scanning mode scanning the original with the ADF 5, when plural originals G are set on the ADF 5, the image scanning apparatus 1 first lights up the LED 22 under the control of LED controller 43 to scan the white standard plate 11, and drives the motor 36 under the control of the motor controller 42. Next, the image scanning apparatus 1 moves the image scanning unit 6 to an ADF scanning position below the glass for ADF 12 and drives the motor 36 to separate the plural originals G are set on the original table of the ADF 5 one by one, and feeds them to a scanning position of the glass for ADF 12. Then, the originals are fed at a constant speed and the image scanning unit 6 remains at rest. The image scanning unit 6 irradiates scanning light to the original G from the LED 22, reflects the light reflected by the original G with the mirror 24 to enter the CCD 26 through the lens 25, where the light is photoelectrically converted to read the image of the original G.

In a book mode scanning the image data of the original G fixedly set on the contact glass 10, when an original G is set on the contact glass 10 while the original press plate 4 is opened, the image scanning apparatus 1 lights up the LED 22 under the control of LED controller 43, and first scans the white standard plate 11 to obtain a standard data for shading correction. Then, the image scanning apparatus 1 drives the motor 36 to move the image scanning unit 6 in the scanning (sub-scanning) direction and scan the image of the original 10 on the contact glass 10. Then, the image scanning apparatus 1 moves the image scanning unit 6 over the scanning area shown in FIG. 1 to scan the image of the original 10 on the contact glass 10.

The image scanning apparatus 1 feeds an analog image signal of the original G read by the image scanning unit 6 from the CCD 26 to the AFE 31, where the analog signal is converted into a digital signal which is fed to the halation detector 32.

Figure 4:
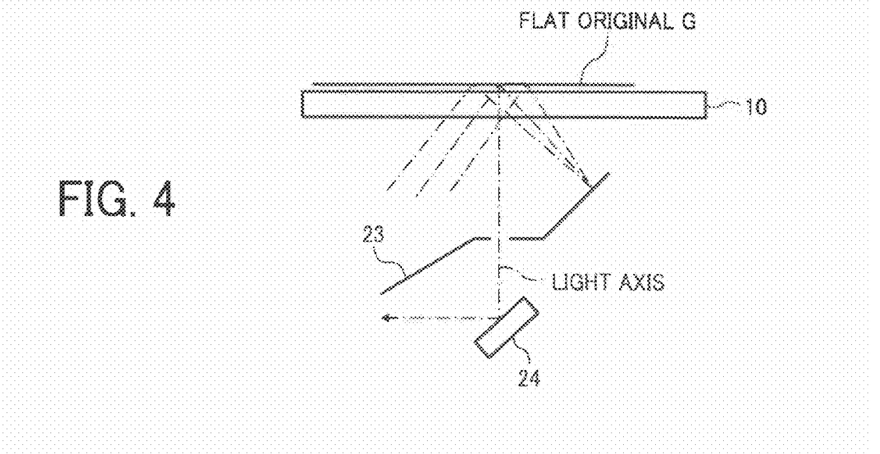
FIG. 4 is a schematic view illustrating a normal status of scanning an original of the image scanning unit in book mode.
Figure 5:
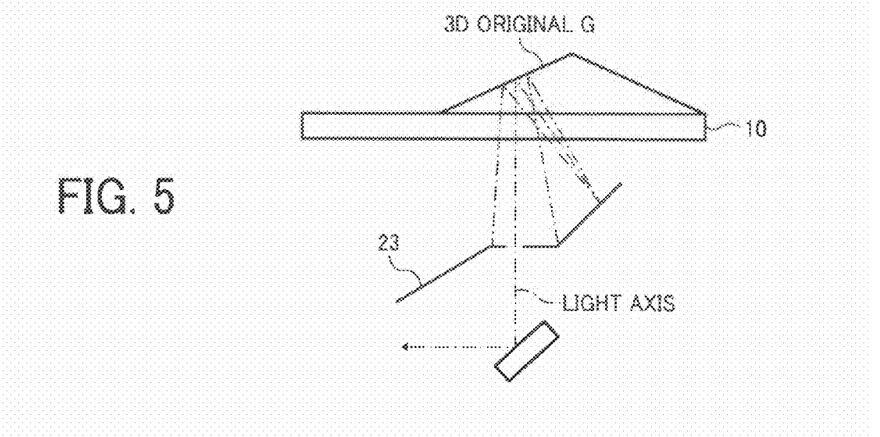
FIG. 5 is a schematic view illustrating a status of scanning an original of the image scanning unit in book mode when halation occurs.

In the book mode, particularly when the original G set on the contact glass 10 is a flat original G as shown in FIG. 4, the flat original G closely contacts the contact glass 10 and the image scanning unit 6 can properly scan the image of the flat original G. However, when the original G set on the contact glass 10 is a 3D original having a part such as a binding margin floating from the surface of the contact glass 10 as shown in FIG. 5, the scanned light is regularly reflected at the part such as a binding margin floating from the surface of the contact glass 10 because the surface of the 3D original to be scanned does not closely contact the contact glass 10. The regularly-reflected light having high intensity directly enters the CCD 26, and the image read thereby locally has a part where the light intensity is high, which corresponds to the arrayed pitch of the LED 22 which is a dotted light-emitting element.

Figure 6:
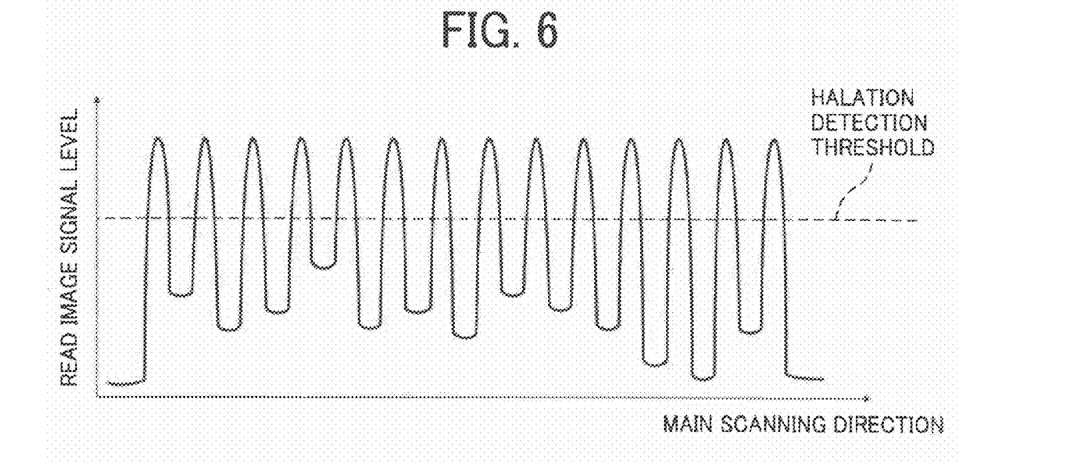
FIG. 6 is a schematic view illustrating an example of image data of a line where halation occurs.

The image data when halation occurs has a signal level higher than a halation detection threshold at a predetermined interval in a line in the main scanning direction as shown in FIG. 6.

Such a blank dotted halation image data occurs when an incident light having light intensity higher than the halation detection threshold enters the CCD 26 at a pixel interval corresponding to an arrayed pitch of the LED 22 as mentioned above.

When the LED 22 is used as a scanning light source, the light intensity dottedly becomes higher in the main scanning direction, resulting in production of abnormal images having dotted blanks. In addition, such halation noticeably occurs when the originals have more glossiness.

Figure 7:
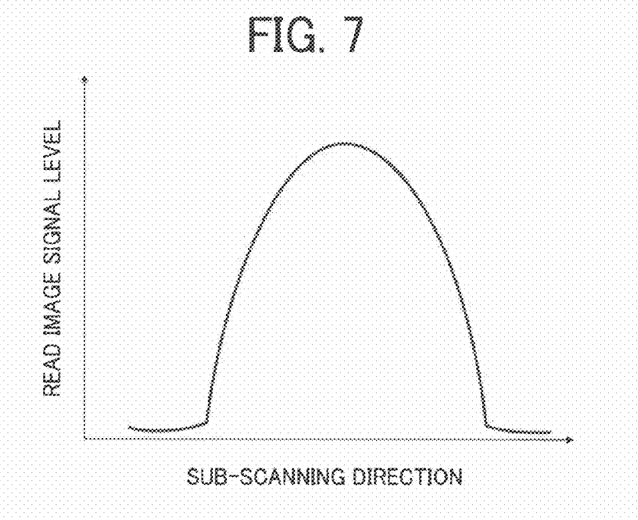
FIG. 7 is a schematic view illustrating an example of image data where halation occurs in a sub-scanning direction.

Further, the image data when halation occurs, in the sub-scanning direction, a signal level is high in a line where halation occurs and becomes lower with increasing distance from the line where halation occurs.

Halation is likely to occur when an original on the contact glass 10 is scanned as mentioned above, halation possibly occurs when an original fed on the glass for ADF 12 is scanned. The process of preventing halation in Example can be used not only when scanning an original on the contact glass 10 but also when an original fed on the glass for ADF 12 is scanned.

The image scanning apparatus 1 subjects image data digitally converted by the AFE 31 to a necessary image processing at the image processor 33. Before the image processing, the halation detector 32 detects whether halation occurs in the image data digitally converted by the AFE 31. The image processor 33 subjects the image data to a halation correction process when halation occurs, and to an ordinary image processing.

Figure 8:
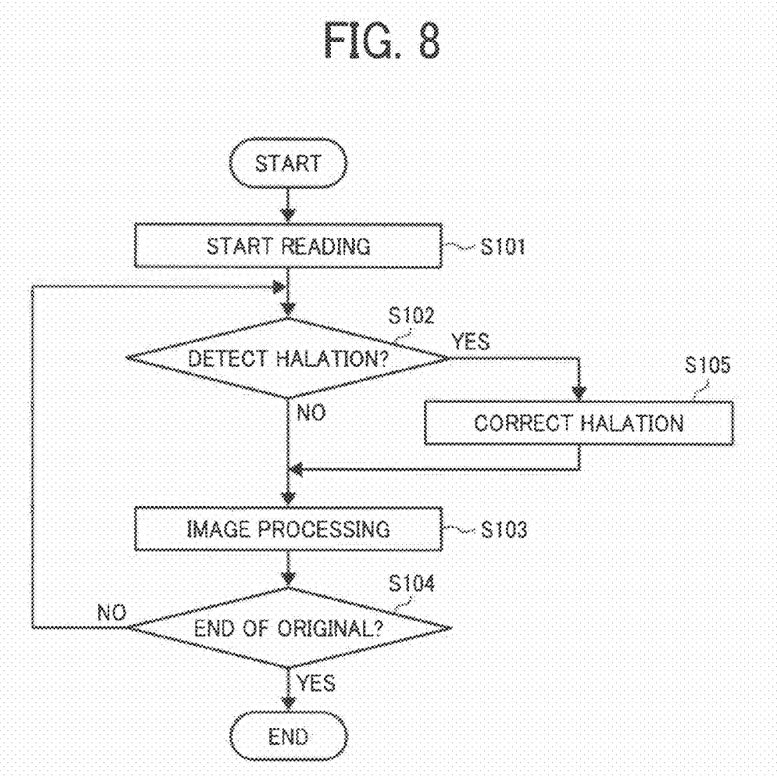
FIG. 8 is a flow chart showing an embodiment of the image scanning process of the present invention.

Namely, as shown in FIG. 8, when the image scanning apparatus 1 starts scanning the original (STEP S101), the CPU 34 has the halation detector 32 detect whether halation occurs in one line of digital image data the image scanning unit 6 entered through the AFE 31 into the halation detector 32 (STEP S102). When the halation detector 32 does not detect occurrence of halation, the CPU 34 has the image processor 33 make a necessary image process (STEP S103) and detects the terminal of the original (STEP S104).

When the terminal of the original is not detected at STEP S104, returning to STEP S102, the CPU 34 subjects the following line-image data to the same processes as above from the detection of halation (STEP S102 to STEP S104). When the halation detector 32 detects occurrence of halation at STEP S102, the CPU 34 has the image processor 33 make a halation correction process (STEP S105). After having the image processor 33 make a halation correction process, the CPU 34 has the image processor 33 make an ordinary and necessary image process (STEP S103) and detects the terminal of the original (STEP S104). When the terminal of the original is not detected, returning to STEP S102, the CPU 34 makes the same processes as above (STEP S102 to STEP S105). When the terminal of the original is detected at STEP S104, the CPU 34 finishes image scanning process.

Figure 9:
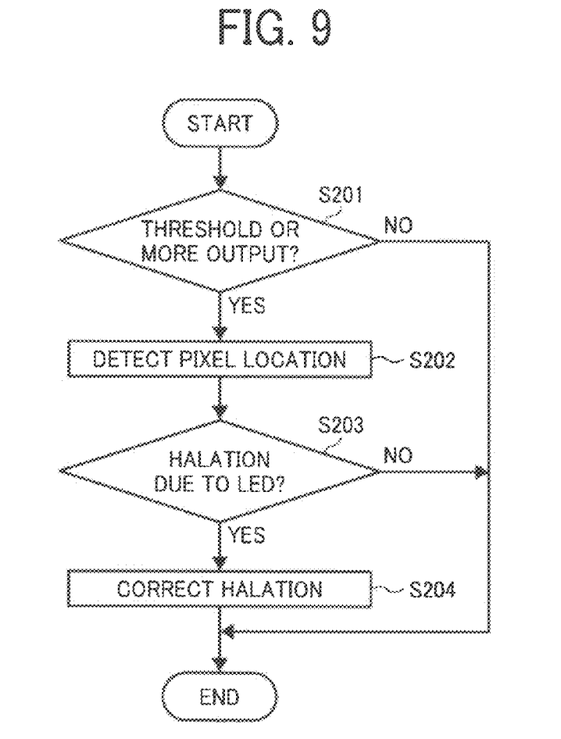
FIG. 9 is a flowchart showing an embodiment of the halation detection process of the present invention.

The halation detector 32 executes the halation detection process at STEP S102 as shown in FIG. 9. Namely, the halation detector 32 checks whether one line of image data entered from the AFE 31 includes image data (pixel data) having not less than a predetermined threshold per pixel (STEP S201). The threshold is a data value (pixel value) on which whether halation possibly occurs is determined, and is previously fixed based on properties, etc. of the image scanning apparatus 1 and stored in a nonvolatile memory, etc. in the halation detector 32.

When there is no image data having not less than the threshold at STEP S201, the halation detector 32 determines no halation occurs in the line-image data and finishes halation detection process thereof.

When there is image data having not less than the threshold at STEP S201, the halation detector 32 detects each pixel position of the image data having not less than the threshold and memorizes the position in an inner memory, etc. (STEP S202), and compares the pixel position of the image data having not less than the threshold with an arrayed position of the LED 22 in the main scanning direction previously stored in a nonvolatile memory, etc. Then, depending on whether the pixel position having not less than the threshold corresponds to the arrayed position of the LED 22 in the main scanning direction, the halation detector 32 determines whether the image data having not less than the threshold is due to halation caused by the LED 22 (STEP S203).

Determining there is no halation at STEP S203, the halation detector 32 finishes halation detection process of the line-image data. Determining there is halation, the halation detector 32 feeds the image data to the image processor 33 and notifies the CPU 34 of occurrence of halation, and the CPU 34 has the image processor 33 make halation correction process (STEP S204).

Figure 10:
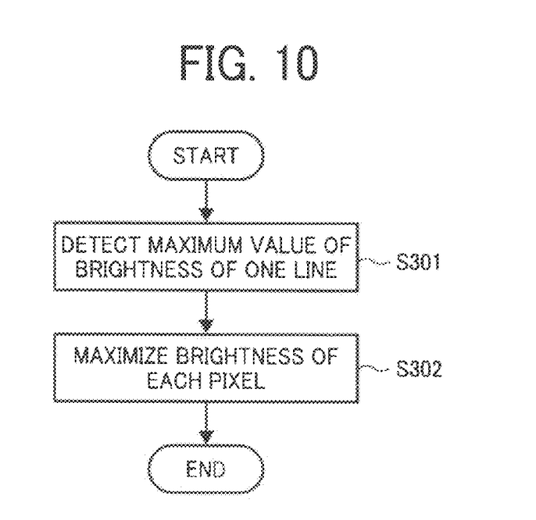
FIG. 10 is a flow chart showing an embodiment of the halation correction process of the present invention.

The CPU 34 has the image processor 33 make the halation correction processes in FIGS. 8 and 9 as shown in FIG. 10.

Namely, the image processor 33 computes brightness of all pixels of the line-image data determined by the halation detector 32 to have halation and detects a maximum brightness of the line-image data (STEP S301). The image processor 33 corrects the brightness of all pixels of the line-image data determined by the halation detector 32 to have halation to the maximum brightness while keeping hues of the pixels to correct halation (STEP S302). Namely, abnormal images having dotted blanks caused by dotted plural LEDs 22 are corrected to linear images having high brightness so as to visually be seen normal.

Figure 11:
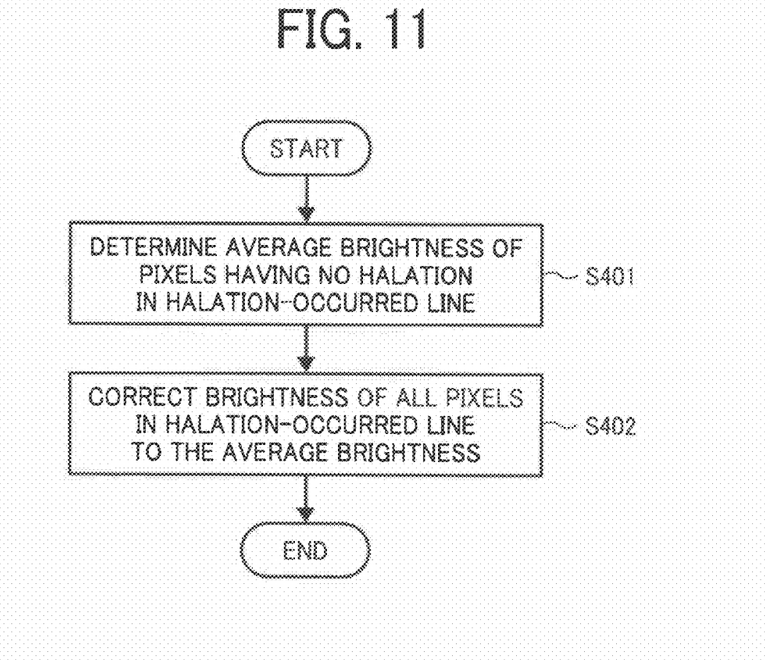
FIG. 11 is a flowchart showing another embodiment of the halation correction process of the present invention.

In the halation correction processes in FIGS. 8 and 9, e.g., as shown in FIG. 11, all pixels of line-image data having halation may be corrected to have an average brightness of pixels of image data having no halation (an average of brightness of pixels having no halation).

Namely, the image processor 33 computes total brightness of image data of all pixels having less than the halation detection threshold in FIG. 6 (image data of pixels having no halation: image data of non halation-occurrence pixels) in the line-image data determined by the halation detector 32 to have halation (halation-occurrence line-image data). The total brightness of the non halation-occurrence pixels is divided by the number of the non halation-occurrence pixels to determine an average of brightness (average brightness) of all the non halation-occurrence pixels (STEP S401).

Namely, the halation detector 32, as shown in FIG. 6, compares every pixel of image data of lines to be detected with a threshold (halation detection threshold) and determines whether the lines to be detected has halation depending on whether the pixel position having not less than the threshold corresponds to the arrayed position of the LED 22 in the main scanning direction. The image processor 33 computes brightness of image data of pixels having less than the threshold (non halation-occurrence pixels) in the line-image data determined by the halation detector 32 to have halation, and computes total brightness of all the non halation-occurrence pixels, which is divided by the number of the non halation-occurrence pixels to determine an average brightness the non halation-occurrence pixels.

The image processor 33 corrects the brightness of all pixels of the line-image data determined to have halation to the average brightness while keeping hues of the pixels to correct halation (STEP S402). Namely, abnormal images having dotted blanks caused by dotted plural LEDs 22 are corrected into images having an average brightness of pixels having no halation in the same line so as to visually be seen normal.

The image scanning apparatus 1 of the present invention irradiates scanned light emitted from the plural dotted light-emitting elements LED 22 linearly arrayed in the main scanning direction to the original G through the contact glass 10 or the glass 12 for ADF, photoelectrically converts the scanned light reflected from the original G with the CCD 26 to produce line-image data, detects whether the line-image data has halation with the halation detector 32, and corrects all pixels of the line-image data detected to have halation to have a predetermined pixel value.

Therefore, dotted blank halation images when a dot light source including linearly-arrayed LEDs 22 is used are corrected and high-quality scanned images can be obtained at low cost.

In the image scanning apparatus 1 of the present invention, the halation detector 32 compares a pixel value of each pixel of image data with a predetermined threshold and determines whether halation occurs depending on whether all or a part of a position of a pixel having a pixel value greater than the threshold corresponds to a position of the LED 22 in the main scanning direction.

Therefore, halation can properly and easily be detected, and high-quality scanned images can be obtained at low cost.

Further, in the image scanning apparatus 1 of the present invention, the image processor 33 computes brightness of all pixels of line-image data having halation and corrects only the brightness of all pixels into a predetermined brightness.

Therefore, only the brightness of all pixels of line-image data having halation can be corrected to a proper brightness and halation can properly be removed.

In addition, in the image scanning apparatus 1 of the present invention, the image processor 33 computes brightness of all pixels of line-image data having halation and detects a maximum brightness, and corrects only the brightness of all pixels of line-image data into the maximum brightness.

Therefore, line-image data having halation can simply and easily be corrected to have linear halation, and abnormal images can simply be prevented and image quality can easily be improved at low cost.

Further, in the image scanning apparatus 1 of the present invention, the image processor 33 computes an average of brightness of pixels having no halation in line-image data having halation, and corrects brightness of all pixels of the line-image data having halation into the average of brightness of pixels having no halation.

Therefore, line-image data having halation can simply and easily be corrected to be less sensitive to human eyes and image quality can easily be improved more at low cost.

In addition, the halation detector 32 may detect whether the LED 22 is abnormal per line based on image data at STEP S203 determining halation in FIG. 9.

Thus, abnormality of the LED 22 can properly be detected at low cost, and image quality can be improved more.

In this case, the halation detector 32 may compare a pixel value of each pixel of image data with a predetermined threshold previously stored in a nonvolatile memory, etc., and determine whether the LED is abnormal depending on all or a part of a position of a pixel having a pixel value greater than the threshold corresponds to a position of the LED 22 in the main scanning direction.

Thus, abnormality of the LED 22 can more properly be detected at low cost, and image quality can be improved more.

This application claims priority and contains subject matter related to Japanese Patent Application No. 2009-062142, filed on Mar. 14, 2009, the entire contents of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An image scanning apparatus, comprising:
a contact glass configured to have an original to be scanned on;
a light source, comprising plural dotted light-emitting elements linearly arrayed in a main scanning direction, configured to emit scanning light to the original;
a photoelectric converter configured to photoelectrically convert the scanning light reflected from the original to produce line-image data in the main scanning direction;
a halation detector configured to receive the line-image data and detect whether the line-image data has halation; and
a corrector configured to receive information from the halation detector regarding whether the line-image data includes halation and based on the received information perform digital processing on the produced line-image data, the digital processing changing a pixel value of each pixel of the produced line-image data having halation, to a predetermined pixel value.

2. The image scanning apparatus of claim 1, wherein the halation detector comprises:
a comparator configured to compare a pixel value of each pixel of the line-image data with a predetermined threshold; and
a determiner configured to determine whether halation occurs depending on whether a pixel position having a pixel value greater than the threshold corresponds to a position of the dotted light-emitting elements in the main scanning direction.

3. The image scanning apparatus of claim 1, wherein the dotted light-emitting element is an LED.

4. The image scanning apparatus of claim 1, wherein the corrector computes brightness of all pixels of the line-image data and corrects only the brightness of all pixels of the line-image data having halation into a predetermined brightness based on the computed result.

5. The image scanning apparatus of claim 1, wherein the corrector computes brightness of all pixels of the line-image data having halation to detect a maximum brightness and corrects only the brightness of all pixels of the line-image data having halation into the maximum brightness.

6. The image scanning apparatus of claim 1, wherein the corrector computes brightness of pixels having no halation in the line having halation to determine an average brightness of the pixels having no halation, and corrects only brightness of all pixels of the line-image data having halation into the average brightness.

7. The image scanning apparatus of claim 1, further comprising:
an abnormality detector configured to detect abnormality of the dotted light-emitting elements.

8. The image scanning apparatus of claim 7, wherein the abnormality detector comprises:
a comparator configured to compare a pixel value of each pixel of the line-image data with a predetermined threshold; and
an abnormality determiner configured to determine whether the dotted light-emitting elements have abnormality depending on whether all or a part of a pixel position having a pixel value greater than the threshold corresponds to a position of the dotted light-emitting elements in the main scanning direction.

9. An image scanning method, comprising:
emitting scanning light to an original through a transparent table from plural dotted light-emitting elements linearly arrayed in a main scanning direction;
photoelectrically converting reflected scanning light from the original to produce line-image data in the main scanning direction;
detecting halation of the line-image data; and
performing digital processing on the produced line-image data, the digital processing changing a pixel value of each pixel of the produced line-image data having halation, to a predetermined pixel value.

10. The image scanning method of claim 9, wherein the detecting halation comprises:
comparing a pixel value of each pixel of the line-image data with a predetermined threshold; and
determining whether halation occurs depending on whether all or a part of a pixel position having a pixel value greater than the threshold corresponds to a position of the dotted light-emitting elements in the main scanning direction.

11. The image scanning method of claim 9, wherein the correcting pixel values comprises:
computing brightness of all pixels of the line-image data; and
correcting only the brightness of all pixels of the line-image data having halation into a predetermined brightness based on the computed result.

12. The image scanning method of claim 9, wherein the correcting pixel values comprises:
computing brightness of all pixels of the line-image data having halation to detect a maximum brightness; and
correcting only the brightness of all pixels of the line-image data having halation into the maximum brightness.

13. The image scanning method of claim 9, wherein the correcting pixel values comprises:
computing brightness of pixels having no halation in the line having halation to determine an average brightness of the pixels having no halation; and
correcting only brightness of all pixels of the line-image data having halation into the average brightness.

14. An image scanning apparatus, comprising:
a contact glass configured to have an original to be scanned on;
means for emitting scanning light to the original, comprising plural dotted light-emitting elements linearly arrayed in a main scanning direction;
means for photoelectrically converting reflected scanning light from the original to produce line-image data in the main scanning direction;
means for detecting halation of the line-image data; and
means for performing digital processing on the produced line-image data, the digital processing changing a pixel value of each pixel of the produced line-image data having halation, into to a predetermined pixel value.

* * * * *